(12) United States Patent
Ide

(10) Patent No.: US 10,630,390 B2
(45) Date of Patent: Apr. 21, 2020

(54) WIRELESS COMMUNICATION DEVICE AND APPARATUS

(71) Applicant: CANON KABUSHIKI KAISHA, Tokyo (JP)

(72) Inventor: Takeshi Ide, Kamakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/204,288

(22) Filed: Nov. 29, 2018

(65) Prior Publication Data

US 2019/0097731 A1    Mar. 28, 2019

Related U.S. Application Data

(63) Continuation of application No. PCT/JP2017/019677, filed on May 26, 2017.

(30) Foreign Application Priority Data

Jun. 9, 2016    (JP) ................................ 2016-115662

(51) Int. Cl.
*H04B 10/00*    (2013.01)
*H04B 10/50*    (2013.01)
(Continued)

(52) U.S. Cl.
CPC ............ *H04B 10/502* (2013.01); *B25J 9/042* (2013.01); *B25J 19/0029* (2013.01);
(Continued)

(58) Field of Classification Search
CPC .............. H04B 10/502; H04B 10/1141; H04B 10/671; H04B 10/114; H04L 5/0048; B25J 9/042; B25J 19/0029
(Continued)

(56) References Cited

U.S. PATENT DOCUMENTS 5,610,748 A * 3/1997 Sakanaka ............. H04B 10/114
398/130
8,129,989 B2   3/2012 Ide
(Continued)

FOREIGN PATENT DOCUMENTS

JP    3-16050    3/1991
JP    5-136740    6/1993
(Continued)

OTHER PUBLICATIONS

International Preliminary Report, dated Dec. 20, 2018, during prosecution of related application No. PCT/JP2017/019677. (English-language translation included.).
(Continued)

*Primary Examiner* — Mohammad R Sedighian
(74) *Attorney, Agent, or Firm* — Venable LLP

(57) ABSTRACT

When performing contactless communication, occurrence of error in data determined on the receiving side due to attenuation of a wireless signal is prevented on both receiving sides by using a simple configuration. Provided is a wireless communication device including: a transmitting unit provided on a first member and a receiving unit provided on a second member and located at a varying relative distance to the transmitting unit, the transmitting unit generates a first electric signal obtained by superimposing a pilot signal on a digital signal to be transmitted and transmits a wireless signal having an intensity in accordance with the first electric signal, the receiving unit generates a second electric signal in accordance with the intensity of the received wireless signal and detects a pilot signal component from the second electric signal, and the second electric signal is amplified in accordance with an attenuation amount of the pilot signal component.

17 Claims, 14 Drawing Sheets

(51) Int. Cl.
  *B25J 19/00*   (2006.01)
  *H04B 10/114*  (2013.01)
  *B25J 9/04*    (2006.01)
  *H04B 10/67*   (2013.01)
  *H04L 5/00*    (2006.01)

(52) U.S. Cl.
  CPC ....... *H04B 10/114* (2013.01); *H04B 10/1141* (2013.01); *H04B 10/671* (2013.01); *H04L 5/0048* (2013.01)

(58) Field of Classification Search
  USPC .................................................. 398/130, 118
  See application file for complete search history.

(56) References Cited

U.S. PATENT DOCUMENTS 9,042,133 B2    5/2015   Ide

2004/0184822 A1*  9/2004  Yamada ............. H04B 10/1141
                                                        398/202
2006/0072920 A1*  4/2006  Koitabashi ........... H04B 10/801
                                                        398/140
2009/0289591 A1*  11/2009 Kassow ............... B25J 19/0004
                                                        318/568.13

FOREIGN PATENT DOCUMENTS

JP    2003-241003    8/2003
JP    2007-38360     2/2007
JP    2013-34043     2/2013

OTHER PUBLICATIONS

International Preliminary Report on Patentability and Written Opinion of the International Searching Authority dated Aug. 8, 2017 in International application No. PCT/JP2017/019677.

* cited by examiner

WIRELESS COMMUNICATION DEVICE AND APPARATUS

CROSS-REFERENCE TO RELATED APPLICATIONS

This application is a Continuation of International Patent Application No. PCT/JP2017/019677, filed May 26, 2017, which claims the benefit of Japanese Patent Application No. 2016-115662, filed Jun. 9, 2016, both of which are hereby incorporated by reference herein in their entirety.

BACKGROUND OF THE INVENTION

Field of the Invention

The present invention relates to a wireless communication device that performs contactless communication and an apparatus having the wireless communication device.

Description of the Related Art

Joints of robot arms or the like need to perform bidirectional communication between a static member and a rotating member in order to drive a joint. While a scheme using a coiled conductive line or a slip ring may be employed in communication between a static member and a rotating member, it is known that contactless communication is advantageous in terms of easier maintenance. As a scheme of contactless communication, there are an electric field coupling scheme using an electrostatic capacitance, an electromagnetic coupling scheme using an electromagnetic induction, and an optical coupling scheme in which transmission is performed using a light between a light emitting element and a light receiving element, or the like, and the optical coupling scheme is featured in that a direct current component can be transmitted and that an electromagnetic interference is less likely to occur. Japanese Patent Publication No. H03-16050 discloses an optical coupling scheme in which a light emitting element is arranged on a rotating member and a light receiving element is arranged on a static member.

In the configuration of Japanese Patent Publication No. H03-16050, however, the intensity of a light received at the light receiving element changes in accordance with a rotation angle of the rotating member on which the light emitting element is arranged. That is, while the intensity of a light received at the light receiving element is the largest when the light emitting element faces the light receiving element, the intensity of a light received at the light receiving element is the smallest when the rotating member rotates by 180 degrees from a state where the light emitting element faces the light receiving element. On the light receiving side, a light signal is converted into an electric signal, and the logic of data is determined. For example, data of logic 1 is determined when an electric signal is above a logic determination level, and data of logic 0 is determined when an electric signal is below the logic determination level.

However, when a high-level signal is below the logic determination level due to attenuation of a light signal received at the light receiving element, an error may occur in data determined on the receiving side. Further, while Japanese Patent Publication No. H03-16050 discloses the configuration of unidirectional communication, it is necessary to further arrange another light emitting element on the static member and another light receiving element on the rotating member in order to enable bidirectional communication. Therefore, when performing contactless bidirectional communication, it is necessary to avoid occurrence of an error in data determined on the receiving sides in communication in both directions of the bidirectional communication.

Such a problem may arise not only in the optical wireless communication disclosed in Japanese Patent Publication No. H03-16050 but also in any wireless communication such as wireless communication using a radio wave, a wireless communication using an electric field or a magnetic field, or the like.

SUMMARY OF THE INVENTION

Accordingly, the present invention intends to prevent, with a simple configuration, an error from occurring in data determined on the receiving sides due to attenuation of a wireless signal on both receiving sides when performing contactless communication.

A wireless communication device according to the present invention includes: a first transmitting unit provided on a first member and a first receiving unit provided on a second member and located at a varying relative distance to the first transmitting unit, the first transmitting unit generates a first electric signal obtained by superimposing a pilot signal on a first digital signal to be transmitted and transmits a first wireless signal having an intensity in accordance with the first electric signal, the first receiving unit generates a second electric signal in accordance with the intensity of the received first wireless signal and detects a pilot signal component from the second electric signal, and the second electric signal is amplified in accordance with an attenuation amount of the pilot signal component.

According to the present invention, occurrence of error in data determined on the receiving sides due to attenuation of a wireless signal can be prevented with a simple configuration on both receiving sides when performing contactless bidirectional communication.

Further features of the present invention will become apparent from the following description of exemplary embodiments with reference to the attached drawings.

DESCRIPTION OF THE EMBODIMENTS

Embodiments for implementing the present invention will be described in detail below with reference to the drawings.

First Embodiment

Figure 1:
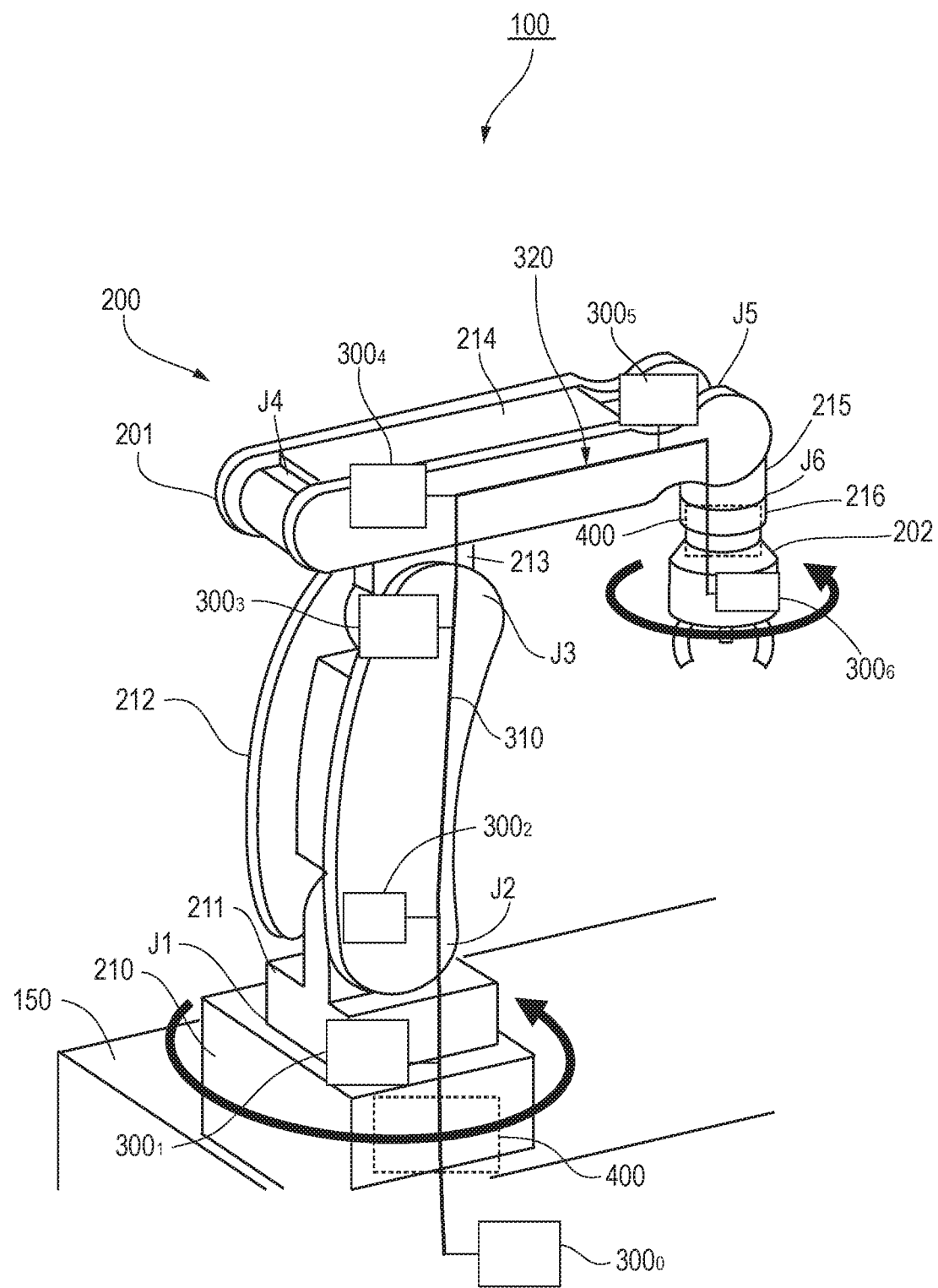
FIG. 1 is a perspective view illustrating a robot device as an example of an apparatus according to a first embodiment.

FIG. 1 is a perspective view illustrating a robot device as an example of an apparatus according to a first embodiment. The robot device 100, which is an apparatus, has a robot 200 and an electronic control device $300_0$ that is a robot control device that controls the robot 200. The robot 200 is fixed on a frame 150. The robot 200 has a vertically articulated robot arm 201 and a robot hand 202 attached to the end of the robot arm 201 as an end effector, which is the end of an arm of the robot 200.

The robot arm 201 has a plurality of links 210 to 216 coupled so as to be able to oscillate or rotate at joints J1 to J6. In the first embodiment, the robot arm 201 is formed of the six joints J1 to J6 including four oscillating shafts and two rotating shafts. An oscillating joint is referred to as an oscillational joint, and a rotating joint is referred to as a rotary joint. In the robot arm 201, each of the joints J1 and J6 is a rotary joint, and each of the joints J2, J3, J4, and J5 is an oscillational joint. The joint J1 allows the link 211 to rotate by 360 degrees or more in forward and reverse directions relatively with respect to the link 210, and the joint J6 allows the link 216 to rotate by 360 degrees or more in forward and reverse directions relatively with respect to the link 215. The robot hand 202 is removable from the joint J6 at the end of the robot arm 201.

Drive devices (not illustrated) that drive the joints and electronic control devices $300_1$ to $300_6$ that control the drive devices are provided to respective joints J1 to J6 of the robot arm 201. The drive device (not illustrated) has a motor and a reduction gear. These electronic control devices $300_0$ to $300_6$ are connected so as to be able to communicate with each other via a bus cable 310 to form a bus communication system 320. The bus cable 310 is provided on and along the inside or the outside of the robot arm 201.

The electronic control device $300_0$ outputs a data signal (digital signal) of a position instruction value indicating a target rotational position of a motor to each of the electronic control devices $300_1$ to $300_6$ via the bus cable 310. Each of the electronic control devices $300_1$ to $300_6$ acquires a detection value of a rotary encoder attached to a motor and controls rotation of the motor so that the detected value is closer to the input position instruction value. Further, each of the electronic control devices $300_1$ to $300_6$ outputs a data signal (digital signal) of the detected value to the electronic control device $300_0$ via the bus cable 310.

In the bus communication system 320, Control Area Network (CAN) is employed for communicating mass data at a high speed. In the first embodiment, nodes connected to the bus cable 310 are the electronic control devices $300_0$ to $300_6$. The electronic control devices $300_0$ to $300_6$ perform communication of data signals on the bus cable 310 by using differential signals.

Figure 2:
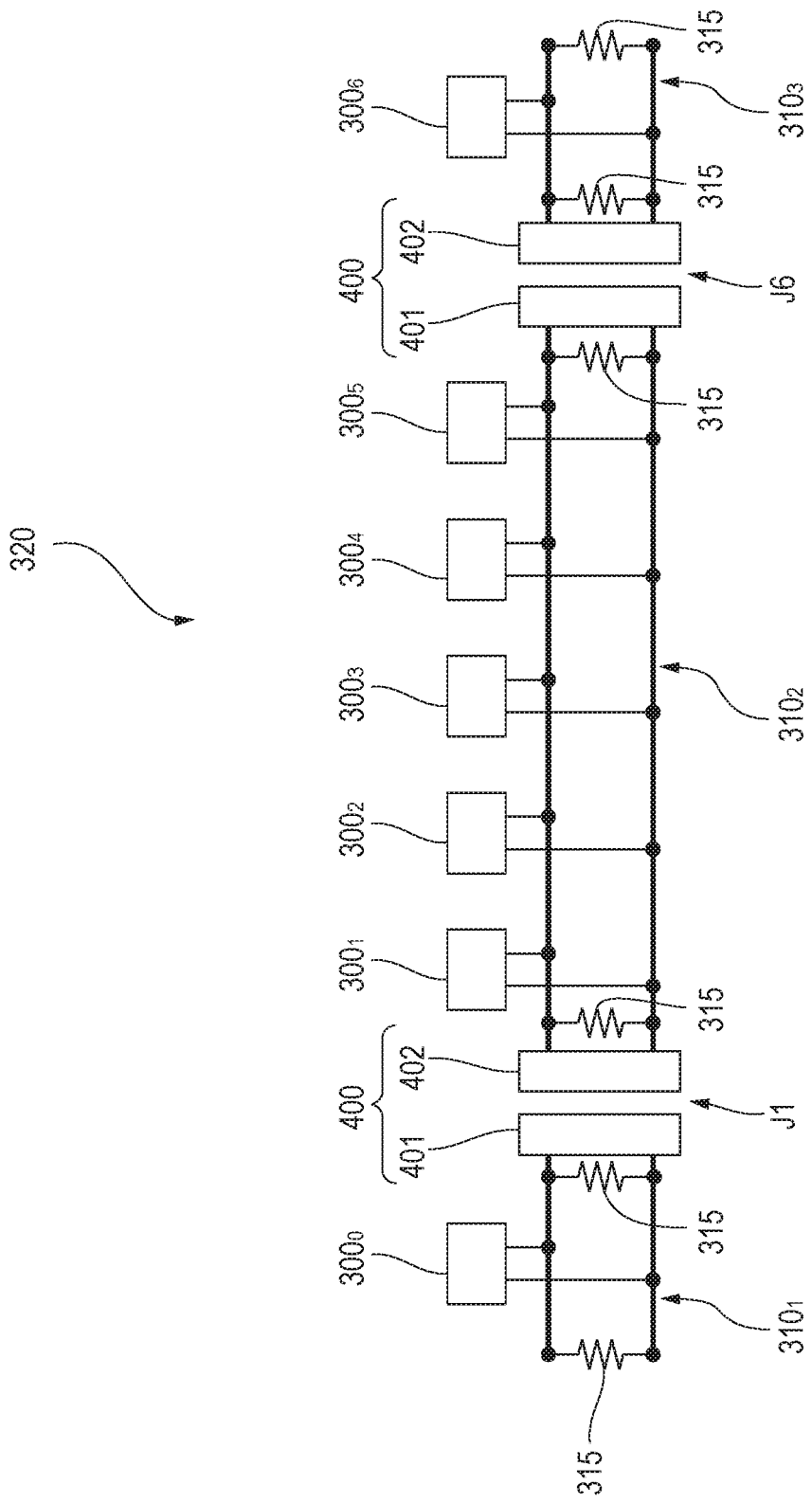
FIG. 2 is a diagram illustrating a bus communication system according to the first embodiment.

FIG. 2 is a diagram illustrating the bus communication system 320 according to the first embodiment. As illustrated in FIG. 2, the bus cable 310 is physically separated into a plurality of bus cables $310_1$, $310_2$, and $310_3$ so that each link rotates freely about the joints J1 and J6. Further, bidirectional communication devices 400, which are wireless communication devices that perform bidirectional communication wirelessly (in a contactless manner) in a near field, are arranged between the bus cable $310_1$ and the bus cable $310_2$ and between the bus cable $310_2$ and the bus cable $310_3$, respectively. Each of the bidirectional communication devices 400 has a pair of signal transmission devices 401 and 402 that wirelessly communicate with each other. Each of the bidirectional communication devices 400 is arranged at the joints J1 and J6.

That is, the electronic control device $300_0$ and the electronic controls devices $300_1$ to $300_6$ communicate data with each other via the bidirectional communication devices 400 arranged at each of the joint J1 and J6. Note that termination resistors 315 are provided to both ends of each of the bus cables $310_1$ to $310_3$, respectively. Thereby, reflection of a signal is prevented at both ends of each of the bus cables $310_1$ to $310_3$, and the voltage of the bus cable is optimized.

Figure 3:
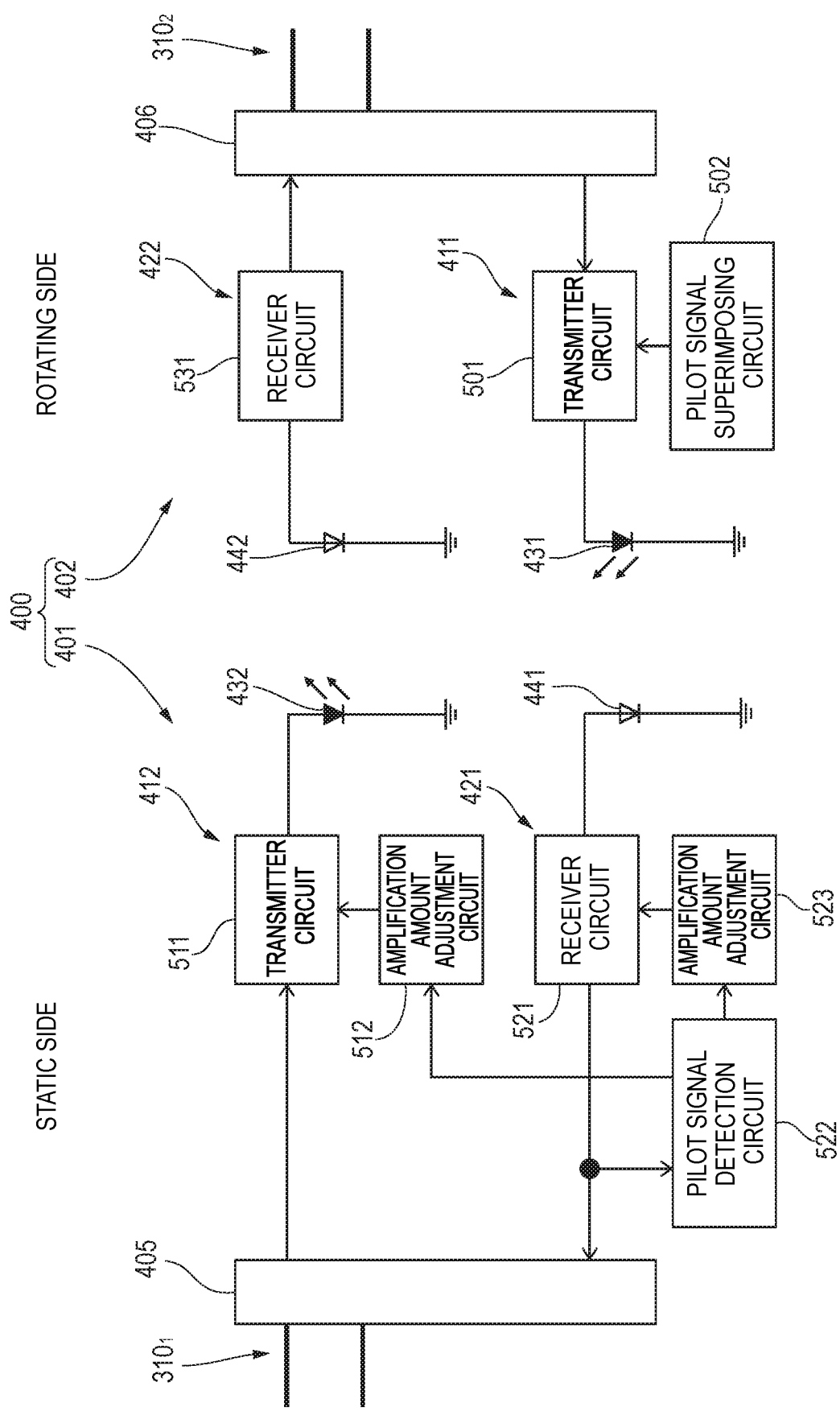
FIG. 3 is a block diagram illustrating a bidirectional communication device according to the first embodiment.

FIG. 3 is a block diagram illustrating the bidirectional communication device according to the first embodiment. Hereinafter, since the bidirectional communication devices 400 arranged at the joints J1 and J6 have the same configuration, the bidirectional communication device 400 arranged at the joint J1 only will be described. Note that while the bidirectional communication device 400 is arranged in each of all the rotary joints of the robot arm 201, the bidirectional communication device 400 may be arranged in at least one rotary joint. For example, the bidirectional communication device 400 may be arranged in one of the joint J1 and the joint J6, and a coiling wiring or a slip ring may be used for the other. The bidirectional communication device 400 has a signal transmission device 401 provided in the link 210 that is the static side and a signal transmission device 402 provided in the link 211 that is the rotary side.

The signal transmission device 401 has a signal control device 405 connected to the bus cable $310_1$, a transmitting unit 412 and a receiving unit 421 connected to the signal control device 405, a light emitting element 432 connected to the transmitting unit 412, and a light receiving element 441 connected to the receiving unit 421. The signal transmission device 402 has a signal control device 406 connected to the bus cable $310_2$, a transmitting unit 411 and a receiving unit 422 connected to the signal control device 406, a light emitting element 431 connected to the transmitting unit 411, and a light receiving element 442 connected to the receiving unit 422. One of or both of the signal control devices 405 and 406 include a CAN repeater circuit used for connecting two bus cables $310_1$ and $310_2$ to each other.

In the first embodiment, the light emitting element 431 corresponds to the first transmitting element, the light receiving element 441 corresponds to the first receiving element, the light emitting element 432 corresponds to the second transmitting element, and the light receiving element 442 corresponds to the second receiving element. Further, in the first embodiment, the transmitting unit 411 corresponds to the first transmitting unit, the receiving unit 421 corresponds to the first receiving unit, the transmitting unit 412 corresponds to the second transmitting unit, and the receiving unit 422 corresponds to the second receiving unit.

The light emitting elements 431 and 432 are LEDs, more specifically, infrared light emitting diodes. Note that the light emitting elements 431 and 432 are not limited thereto but may be visible-light emitting diodes, laser diodes, or the like. In the first embodiment, the light emitting element 431 and the light emitting element 432 emit lights having the same wavelength and are of the same specification. Each of the light receiving elements 441 and 442 is a photodiode, specifically, an SiPIN photodiode. Note that the light receiving elements 441 and 442 are not limited thereto but may be visible-light emitting diodes or the like. Further, each of the light receiving elements 441 and 442 may be a phototransistor. Each size of the light emitting elements 431 and 432 may be approximately 3 mm by 1.5 mm. Each size of the light receiving elements 441 and 442 may be approximately 5.5 mm by 4.8 mm. In such a case, each light receiving face of the light receiving elements 441 and 442 is approximately 5 mm on a side.

When receiving input differential signals that form a data signal from the electronic control device $300_0$ via the bus cable $310_1$, the signal control device 405 converts the differential signals into a single-end signal and outputs the single-end signal to the transmitting unit 412.

The transmitting unit 412 supplies an electric signal used for driving the light emitting element 432 to the light emitting element 432 in response to the single-end signal input from the signal control device 405. The light emitting element 432 emits light at a light emitting intensity in accordance with the intensity (voltage) of the electric signal supplied from the transmitting unit 412. Thereby, the light emitting element 432 transmits a light signal as a wireless signal.

The light receiving element 442 receives a light signal (receives light) as a wireless signal. The receiving unit 422 generates an electric signal in accordance with the intensity of a light signal received at the light receiving element 442 and outputs the generated electric signal (single-end signal) to the signal control device 406. The signal control device 406 performs logic determination on the electric signal input from the receiving unit 422, generates a differential signal in accordance with the determination result, and outputs the differential signal to the bus cable $310_2$.

On the other hand, when being input with a differential signal that is a data signal from the electronic control devices $300_1$ to $300_6$ via the bus cable $310_2$, the signal control device 406 convers the differential signals into a single-end signal and outputs the single-end signal to the transmitting unit 411.

The transmitting unit 411 supplies an electric signal used for driving the light emitting element 431 to the light emitting element 431 in response to the single-end signal input from the signal control device 406. The light emitting element 431 emits light at a light emitting intensity in accordance with the intensity (voltage) of the electric signal supplied from the transmitting unit 411. Thereby, the light emitting element 431 transmits a light signal as a wireless signal.

The light receiving element 441 receives a light signal (receives light) as a wireless signal. The receiving unit 421 generates an electric signal in accordance with the intensity of a light signal received at the light receiving element 441 and outputs the generated electric signal (single-end signal) to the signal control device 405. The signal control device 405 performs logic determination on the electric signal input from the receiving unit 421, generates a differential signal in accordance with the determination result, and outputs the differential signal to the bus cable $310_1$.

Figure 4:
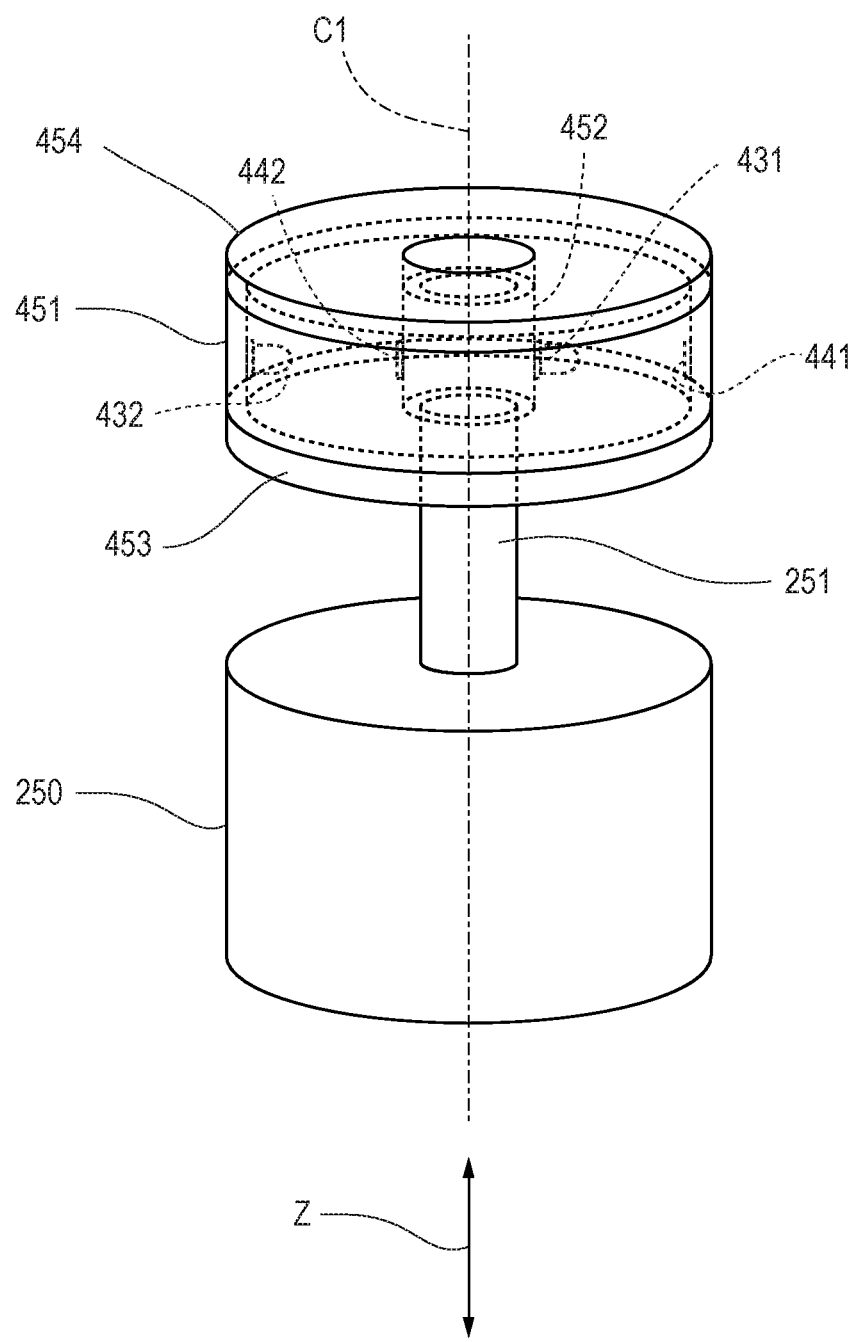
FIG. 4 is a perspective view illustrating a drive device and the periphery of the drive device arranged in a rotary joint of a robot arm according to the first embodiment.

As discussed above, the bidirectional communication device 400 performs bidirectional communication in a contactless manner. The arrangement of the light emitting elements 431 and 432 and the light receiving elements 441 and 442 will now be described. FIG. 4 is a perspective view illustrating a drive device and the periphery of the drive device arranged in the joint J1, which is a rotary joint, of the robot arm according to the first embodiment. Note that, since the joint J6, which is a rotary joint, has the same configuration, the description thereof will be omitted.

A drive device 250 arranged in the joint J1 rotary-drives the link 211, which is the other link of the pair of links 210 and 211, with respect to the link 210, which is one link of the pair of links 210 and 211, and has a motor (and a reduction gear).

A stator of the drive device 250 is fixed to one of the link 210 and the link 211, for example, the link 210 (FIG. 1). A cylindrical member 451, which corresponds to the first member, is fixed and attached to the link 210 to which the stator of the drive device 250 is fixed.

A shaft member 452, which corresponds to the second member, is fixed and attached to a rotary shaft 251 extending from the rotor of the drive device 250. The shaft member 452 is arranged inside the cylindrical member 451 coaxially with the cylindrical member 451 and relatively rotated with respect to the cylindrical member 451 about the center axis C1 of the cylindrical member 451. The shaft member 452 is fixed to the other of the link 210 and the link 211, for example, the link 211. Thereby, the drive force of the drive device 250 is transferred to the link 211, and the link 211 rotates with respect to the link 210.

Figure 5:
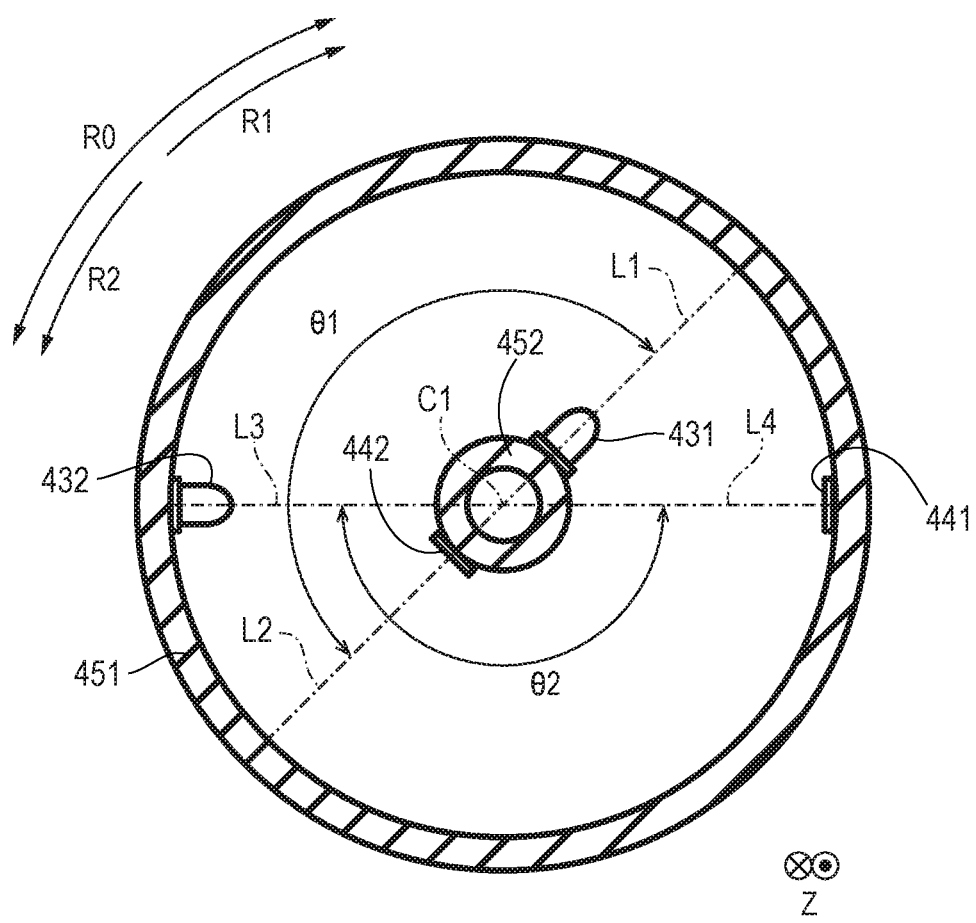
FIG. 5 is a diagram illustrating a locational relationship of light emitting elements and light receiving elements in the first embodiment.

FIG. 5 is a diagram illustrating a locational relationship of light emitting elements and light receiving elements. FIG. 5 is a diagram when the configuration illustrated in FIG. 4 is viewed from the Z-direction.

The light emitting element 431 and the light receiving element 442 of the signal transmission device 402 are arranged on one of the cylindrical member 451 and the shaft member 452, namely, the shaft member 452 in the first embodiment. The light emitting element 432 and the light receiving element 441 of the signal transmission device 401 are arranged on the other of the cylindrical member 451 and the shaft member 452, namely, the cylindrical member 451 in the first embodiment. More specifically, the light emitting element 431 and the light receiving element 442 are fixed on the outer circumference face of the shaft member 452, and the light emitting element 432 and the light receiving element 441 are fixed on the inner circumference face of the cylindrical member 451. Therefore, the light emitting element 431 and the light receiving element 442 rotate in the circumference direction R0 about the center axis C1 together with the shaft member 452.

In FIG. 5, the circumference direction R0 includes two directions of the clockwise direction R1 and the counterclockwise direction R2, and the shaft member 452 is rotary-driven selectively in one direction of the two directions of the clockwise direction R1 and the counterclockwise direction R2 by using the drive device 250 (FIG. 4).

The counterpart of the transmission of the light emitting element 431 arranged on the shaft member 452 is the light receiving element 441 arranged on the cylindrical member 451. The counterpart of the transmission of the light emitting element 432 arranged on the cylindrical member 451 is the light receiving element 442 arranged on the shaft member 452. Further, thereby, contactless communication is performed.

The shaft member 452 is a hollow cylindrical member using a white resin of a diameter of 20 mm, a length of 14 mm, and a thickness of 2 mm, for example. The cylindrical member 451 is a hollow cylindrical member using a white resin of a diameter of 64 mm, a length of 14 mm, and a thickness of 2 mm, for example. The inner circumference face of the cylindrical member 451 and the outer circumference face of the shaft member 452 are reflection surfaces on which light is reflected. Cables connected to the light emitting element 431 and the light receiving element 442 are arranged inside the shaft member 452.

As illustrated in FIG. 4, white resin cap members 453 and 454 are arranged on both ends in the Z-direction of the cylindrical member 451. The cap members 453 and 454 have a function of confining a light and reducing light attenuation due to scattering and are able to reduce the dynamic range of amplification correction described later compared to the case without the cap members 453 and 454. Holes of a diameter of 20 mm are formed in the cap members 453 and 454 at the center portions in which the shaft member 452 is inserted.

The hole of the cap member 453 is provided to insert the rotary shaft 251 of the drive device 250 therethrough. The hole of the cap member 454 is used to draw the cables connected to the light emitting element 431 and the light receiving element 442. The shaft member 452 may not be hollow and the cables may be drawn on and along the surface of the shaft member 452, however, this requires a gap for the number of cables between the shaft member 452 and the cylindrical member 451, and attenuation may occur due to a light leaking from the gap. With the shaft member 452 being hollow, leakage from the gap can be reduced.

The light emitting element 431, the light emitting element 432, the light receiving element 441, and the light receiving element 442 are arranged in the same space forming a wireless transmission path, and this allows for reduction in space. Thereby, reduction in size of the robot arm 201 can be realized, and since the weight thereof can be reduced, the controllability of the robot arm 201 is improved.

In the first embodiment, the light emitting element 431, the light emitting element 432, the light receiving element 441, and the light receiving element 442 are arranged at the same position in the Z-direction in which the center axis C1 that corresponds to the rotation axis of the rotary shaft 251 extends, that is, arranged on the same plane in the Z-direction in which the center axis C1 extends.

As illustrated in FIG. 5, the light emitting element 431 and the light receiving element 442 are arranged at different positions in the circumference direction R0 on the shaft member 452 so that the light emitting element 431 and the light receiving element 442 do not overlap with each other. Similarly, the light emitting element 432 and the light receiving element 441 are arranged at different positions in the circumference direction R0 on the cylindrical member 451 so that the light emitting element 432 and the light receiving element 441 do not overlap with each other.

In this example, an angle (first angle) between a line L1 extending from the center axis C1 to the center of the light emitting element 431 and a line L2 extending from the center axis C1 to the center of the light receiving element 442 when viewed from the Z-direction is denoted as an angle $\theta 1$. Further, an angle (second angle) between a line L3 extending from the center axis C1 to the center of the light emitting element 432 and a line L4 extending from the center axis C1 to the center of the light receiving element 441 when viewed from the Z-direction is denoted as an angle $\theta 2$.

The light emitting elements 431 and 432 and the light receiving elements 441 and 442 are arranged at positions where the angle $\theta 1$ and the angle $\theta 2$ are the same when viewed from the Z-direction. In the first embodiment, the angles $\theta 1$ and $\theta 2$ are each 180 degrees. In such a way, the positional relationship of the light emitting element 431 and the light emitting element 442 fixed on the shaft member 452 and the positional relationship of the light emitting element 432 and the light emitting element 441 fixed on the cylindrical member 451 are symmetrical at 180 degrees.

Figure 6A:
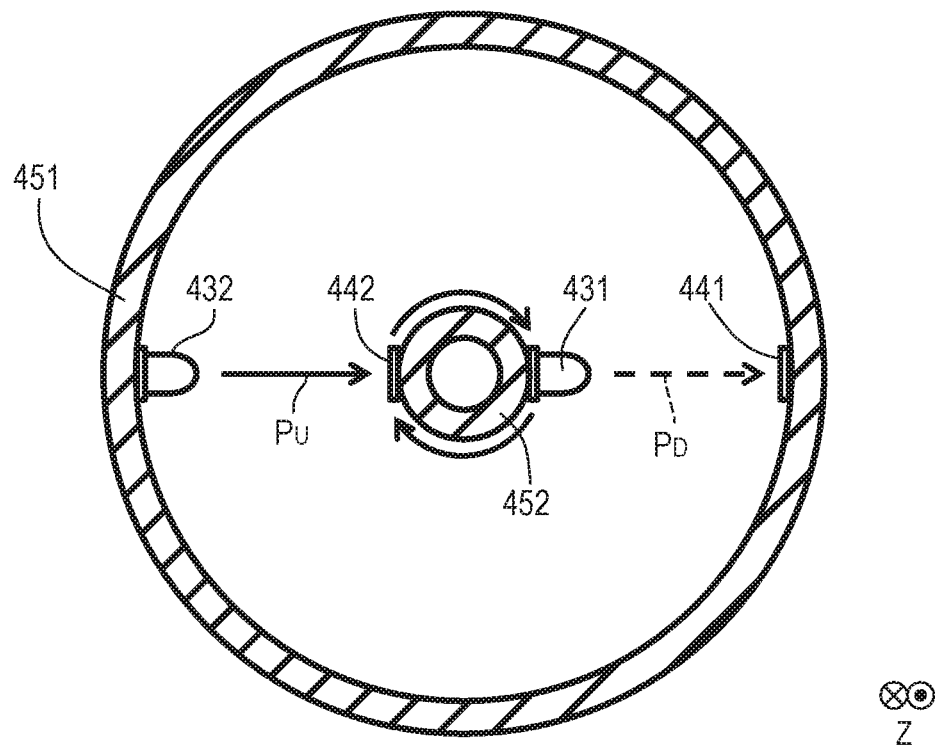
FIG. 6A is a diagram illustrating a state where the rotation angle of a shaft member relative to a reference is 0 degree.
Figure 6B:
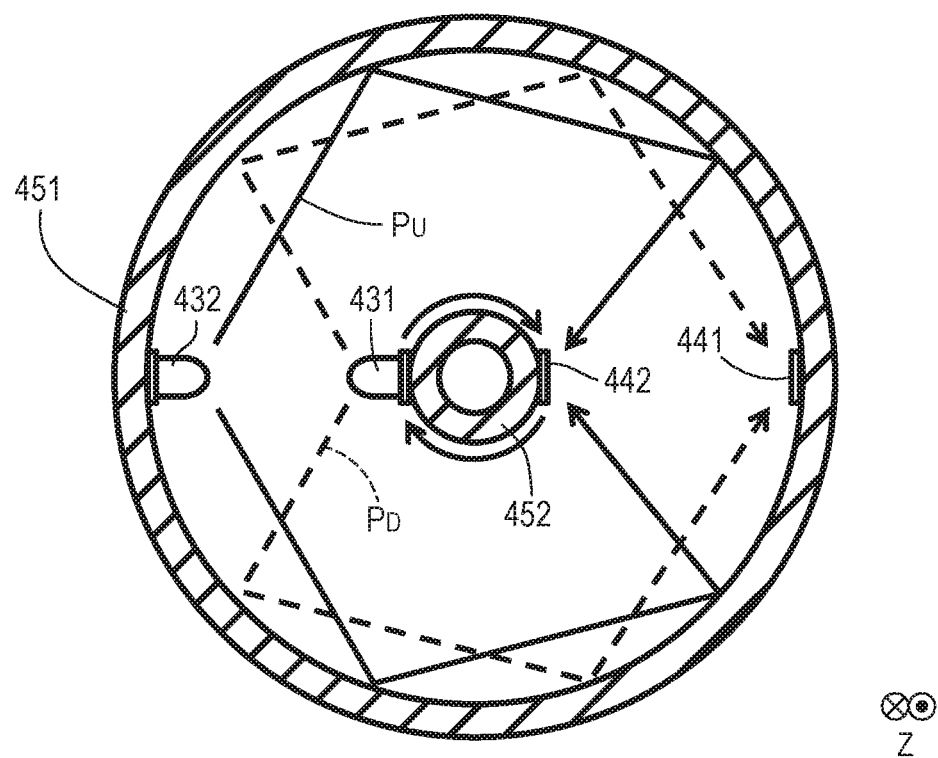
FIG. 6B is a diagram illustrating a state where the rotation angle of the shaft member relative to the reference is 180 degrees.

FIG. 6A is a diagram illustrating a state where the rotation angle of the shaft member relative to a reference is 0 degree with respect to a state where the light emitting element faces the light receiving element as the reference, and FIG. 6B is a diagram illustrating a state where the rotation angle of the shaft member relative to the reference is 180 degrees.

The communication from the signal transmission device 401 on the cylindrical member 451 side to the signal transmission device 402 on the shaft member 452 side is defined as upstream communication, and an upstream communication light path from the light emitting element 432 to the light receiving element 442 is denoted as $P_U$. Further, the communication from the signal transmission device 402 on the shaft member 452 side to the signal transmission device 401 on the cylindrical member 451 side is defined as downstream communication, and a downstream communication light path from the light emitting element 431 to the light receiving element 441 is denoted as $P_D$.

As illustrated in FIG. 6A, when the rotation angle of the shaft member 452 is 0 degree, the light emitting element 431 faces the light receiving element 441, and the light emitting element 432 faces the light receiving element 442. Therefore, the light emitting element 431 and the light receiving element 441 come the closest to each other, and the light emitting element 432 and the light receiving element 442 come the closest to each other, which results in the shortest light paths $P_U$ and $P_D$, the smallest attenuation amount of the light in both upstream communication and downstream communication, and the highest reception intensity of the light received at the light receiving elements 441 and 442.

On the other hand, as illustrated in FIG. 6B, when the rotation angle of the shaft member 452 is 180 degrees, the light emitting element 431 faces the opposite side of the light receiving element 441, and the light emitting element 432 faces the opposite side of the light receiving element 442. This results in the longest light paths $P_U$ and $P_D$, the largest attenuation amount of the light in both upstream communication and downstream communication, and the lowest reception intensity of the light received at the light receiving elements 441 and 442.

Figure 7:
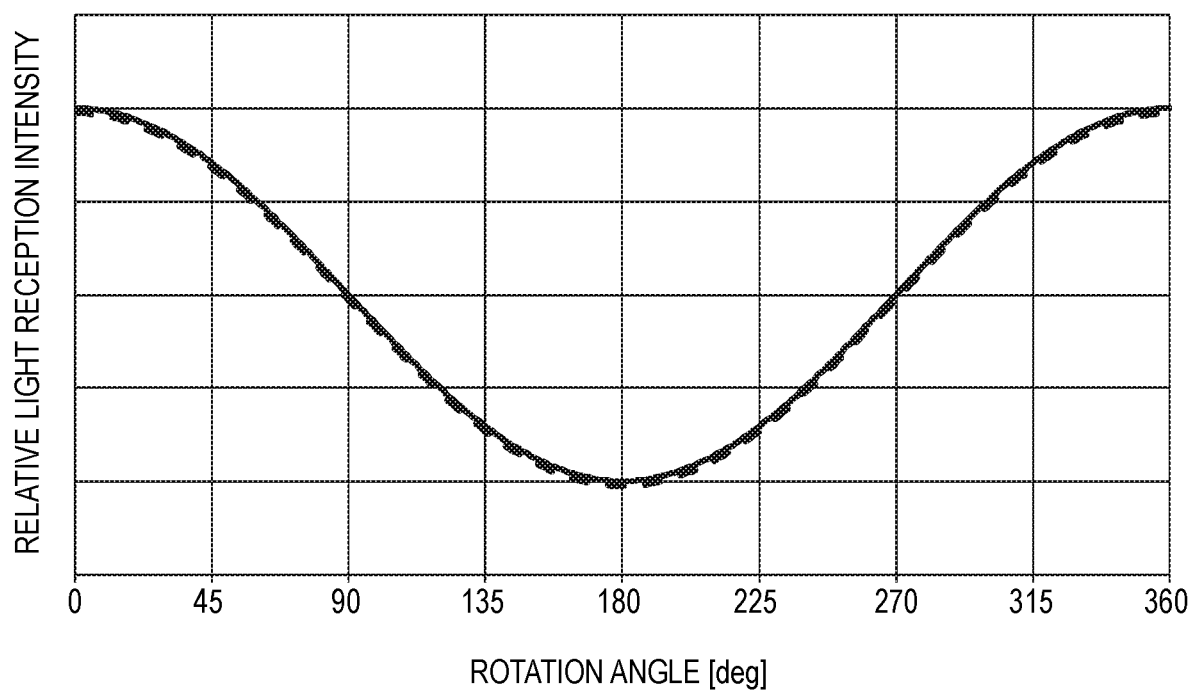
FIG. 7 is a graph illustrating a relative value of a light reception intensity of each light receiving element with respect to a rotation angle of the shaft member in the first embodiment.

FIG. 7 is a graph illustrating the relative value of the light reception intensity of each of the light receiving elements 441 and 442 with respect to the rotation angle of the shaft member 452 in the first embodiment. In FIG. 7, the light reception intensity of the light receiving element 442 (upstream communication) is illustrated by a solid line, and the light reception intensity of the light receiving element 441 (downstream communication) is illustrated by a dashed line. The positional relationship of the light emitting element 431 and the light receiving element 442 on the shaft member 452 side and the positional relationship of the light emitting element 432 and the light receiving element 441 on the cylindrical member 451 side are symmetrical. That is, the angle θ1 and the angle θ2 are the same and equal to 180 degrees. Thus, as illustrated in FIG. 7, a change in the light reception intensity of the light receiving element 441 with respect to the rotation angle of the shaft member 452 is equal to a change in the light reception intensity of the light receiving element 442 with respect to the rotation angle of the shaft member 452.

With the angles θ1 and θ2 being 180 degrees, the intensity of the light transmitted from the light emitting element 431 to the light receiving element 442 is the lowest, and the intensity of the light transmitted from the light emitting element 432 to the light receiving element 441 is the lowest. Further, the light reception sensitivity of the light receiving element 442 is correlated to the ratio of the intensity at which a light emitted by the light emitting element 431, which is an interference light, is received to an intensity at which a light emitted by the light emitting element 432 is received. Similarly, the light reception sensitivity of the light receiving element 441 is correlated to the ratio of an intensity at which a light emitted by the light emitting element 432, which is an interference light, is received to an intensity at which a light emitted by the light emitting element 431 is received. Therefore, with the angles θ1 and θ2 being 180 degrees, the light reception sensitivity of each of the light receiving elements 441 and 442 is the highest.

Figure 8:
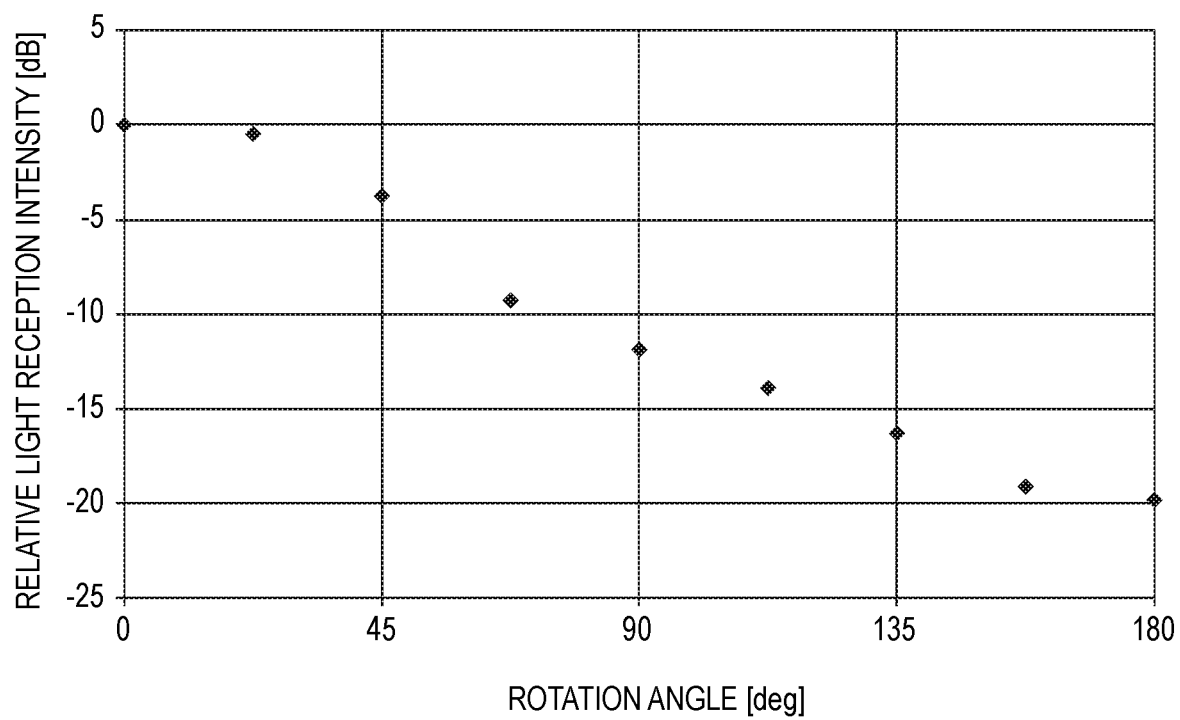
FIG. 8 is a graph illustrating a result of measurement of a light reception intensity of a light receiving element with respect to a rotation angle of a shaft member when a light emitting intensity of a light emitting element is constant.

FIG. 8 is a graph illustrating a result of measurement of the light reception intensity of the light receiving element 442 with respect to a rotation angle of the shaft member 452 when the light emitting intensity of the light emitting element 432 is constant. In FIG. 8, the horizontal axis represents the rotation angle of the shaft member 452, and the vertical axis represents the relative light reception intensity of the light receiving element 442. The light reception intensity is reduced by 20 dB at 180 degrees at which the light emitting element 431 and the light receiving element 441 are the farthest from each other compared to the light reception intensity at 0 degree at which the light emitting element 431 and the light receiving element 441 face and are the closest to each other. Since both the angles θ1 and θ2 are 180 degrees, the light reception intensity in the light receiving element 442 is the same as that in the light receiving element 441.

In the first embodiment, as illustrated in FIG. 3, the transmitting unit 441 has a transmitter circuit 501 and a pilot signal superimposing circuit 502. The transmitting unit 412 has a transmitter circuit 511 and an amplification amount adjustment circuit 512. The receiving unit 421 has a receiver circuit 521, a pilot signal detection circuit 522, and an amplification amount adjustment circuit 523. The receiving unit 422 is formed of a receiver circuit 531.

First, downstream communication will be described. The transmitter circuit 501 is input with an electric signal that is a low-level or high-level first digital signal (single-end signal) to be transmitted from the signal control device 406.

The pilot signal superimposing circuit 502 generates a pilot signal (for example, a sinewave at a predetermined frequency) in a frequency band different from that of the input electric signal. The amplitude of this pilot signal is constant. The transmitter circuit 501 generates an electric signal obtained by superimposing a pilot signal on a digital signal.

Figure 9A:
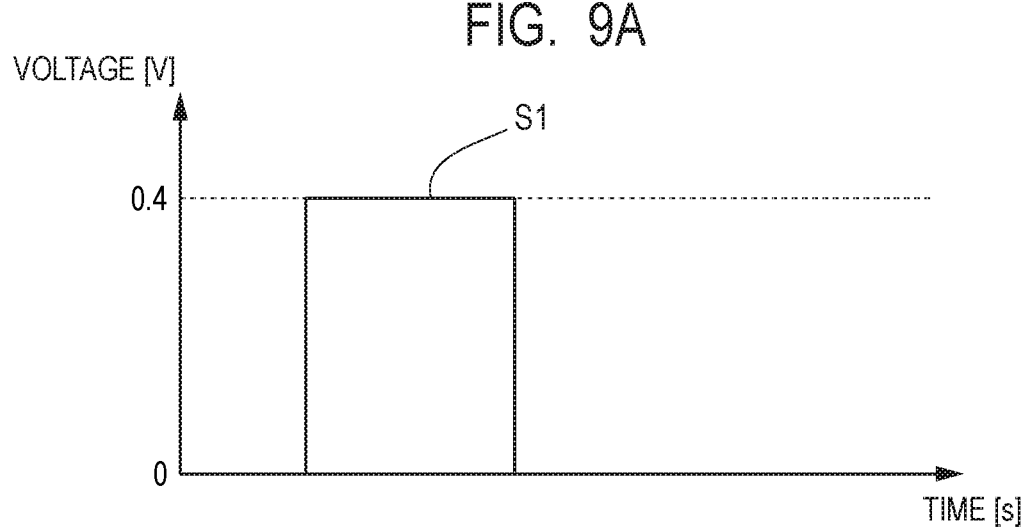
FIG. 9A is a waveform diagram illustrating a digital signal input to a transmitter circuit from a signal control device.
Figure 9B:
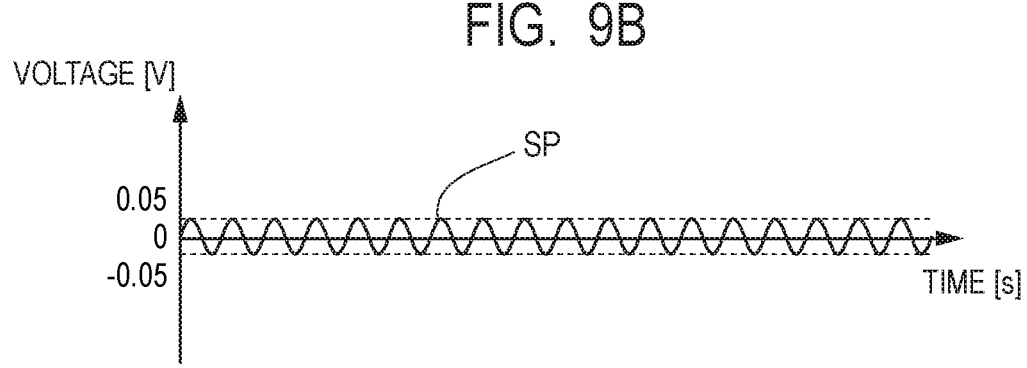
FIG. 9B is a waveform diagram illustrating a pilot signal generated by a pilot signal superimposing circuit.
Figure 9C:
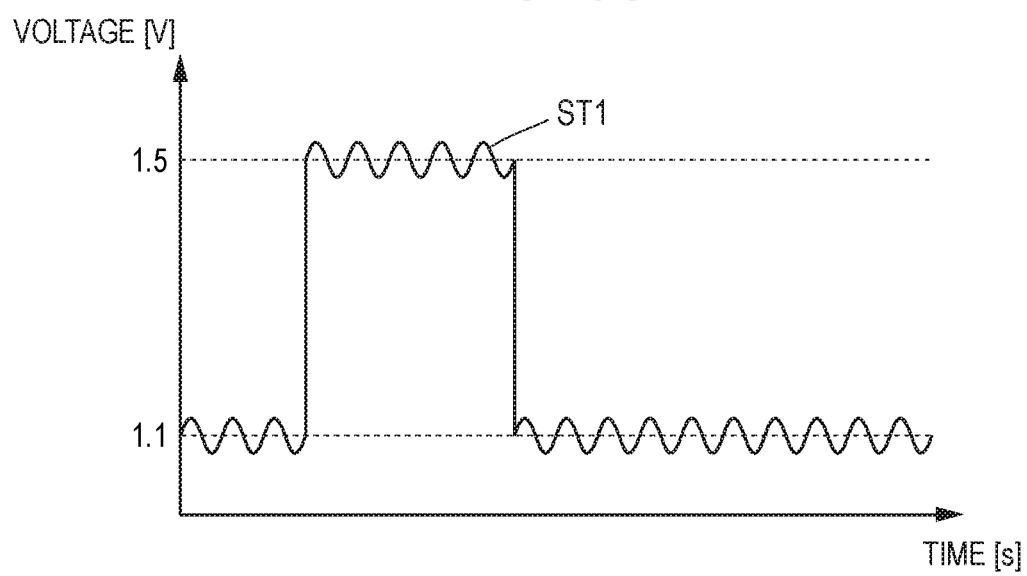
FIG. 9C is a waveform diagram illustrating an electric signal generated by superimposing a pilot signal on a digital signal.

FIG. 9A is a waveform diagram illustrating a digital signal input to the transmitter circuit 501 from the signal control device 406. FIG. 9B is a waveform diagram illustrating a pilot signal generated by the pilot signal superimposing circuit 502. FIG. 9C is a waveform diagram illustrating an electric signal generated by superimposing a pilot signal on a digital signal.

As illustrated in FIG. 9A, a signal input to the transmitter circuit 501 is a digital signal S1 that corresponds to the first digital signal, in which a high-level voltage is 0.4 V, for example, and a low-level voltage is 0, for example. As illustrated in FIG. 9B, the pilot signal superimposing circuit 502 generates a pilot signal SP having an amplitude of a lower voltage than a high-level voltage of the digital signal S1, for example, an amplitude of 0.05 V.

As illustrated in FIG. 9C, the transmitter circuit 501 generates an electric signal ST1 obtained by superimposing the pilot signal SP on the digital signal S1 and outputs (applies) the electric signal ST1 to the light emitting element 431. In the first embodiment here, in order to cause the light emitting element 431 to emit light even with the digital signal S1 being at the low level, a biased electric signal ST1 is output (applied) to the light emitting element 431. For example, 1.1 V is biased. The intermediate voltage of the high level and the low level is 1.3 V. Note that, while the transmitter circuit 501 biases the digital signal S1 in this example, the signal control device 406 may do the same.

The light emitting element 431 transmits, to the light receiving element 441, a light signal (wireless signal) having an intensity in accordance with the electric signal ST1 generated at the transmitting unit 411. That is, the light emitting element 431 emits light at an intensity in accordance with the intensity (voltage) of the electric signal ST1 generated at the transmitting unit 411. The light emitted from the light emitting element 431 propagates in the space between the shaft member 452 and the cylindrical member 451 and reaches the light receiving element 441. The light receiving element 441 receives a light signal (wireless signal) (receives light) transmitted from the light emitting element.

The receiver circuit 521 generates an electric signal in accordance with the intensity of a light (wireless signal) received at the light receiving element 441. This electric signal contains a digital signal component and a pilot signal component. The pilot signal component then attenuates in accordance with the rotation angle of the shaft member 452 as with the digital signal component.

The pilot signal detection circuit 522 is formed of a filter circuit, detects a pilot signal component from the electric signal output from the receiver circuit 521, and outputs, to an amplification amount adjustment circuit 523, the intensity of the pilot signal component that is the detection result. In the first embodiment, an intensity of an electric signal (including a pilot signal component) is a voltage.

The amplification amount adjustment circuit 523 compares the intensity of a pilot signal component with a predefined reference intensity (reference voltage) and amplifies the intensity of an electric signal input to the receiver circuit 521 in accordance with an attenuation amount of the intensity of the pilot signal component with respect to the reference intensity. Specifically, the amplification amount adjustment circuit 523 amplifies the intensity of an electric signal with a larger amplification amount for a larger attenuation amount so as to offset the attenuation amount. In such a way, the reception intensity of an electric signal obtained by the receiver circuit 521 is amplified for an attenuation amount of a pilot signal component. Thereby, even when the attenuation amount of the light intensity changes in accordance with the rotation angle of the shaft member 452, an electric signal with stable high level and low level is output from the receiver circuit 521 of the receiving unit 421. The amplified electric signal is output to the signal control device 405, and logic determination is performed at the signal control device 405. This can prevent an error from occurring in data (logic 0 or 1) determined by the signal control device 405. Note that a pilot signal component may be superimposed on an electric signal output from the receiving unit 421 when there is no problem in the logic determination in the signal control device 405. Therefore, in the first embodiment, a separation circuit that separates a pilot signal component is not required to be arranged in the post-stage of the receiver circuit 521.

Next, upstream communication will be described. The transmitter circuit 511 is input with an electric signal that is a low-level or high-level second digital signal (single-end signal) to be transmitted from the signal control device 405.

In the first embodiment, the pilot signal detection circuit 522 outputs the intensity of a pilot signal component to an amplification amount adjustment circuit 512 of the transmitting unit 412. The amplification amount adjustment circuit 512 compares the intensity of the pilot signal component with a predetermined reference intensity and amplifies the intensity of a digital signal input to the transmitter circuit 511 in accordance with the attenuation amount of the intensity of the pilot signal component with respect to the reference intensity. Specifically, the amplification amount adjustment circuit 512 amplifies the intensity of an electric signal with a larger amplification amount for a larger attenuation amount so as to offset the attenuation amount.

That is, since both the angles θ1 and θ2 are 180 degrees, a light transmitted from the light emitting element 432 and received at the light receiving element 442 is in an attenuation tendency similar to a light transmitted from the light emitting element 431 and received at the light receiving element 441. Thus, at a certain moment, the attenuation amount of a light signal in downstream communication is equal to the attenuation amount of a light signal in upstream communication. Therefore, in the first embodiment, an electric signal is amplified by the transmitting unit 412 in upstream communication in a similar manner that an electric signal is amplified by the receiving unit 421 in downstream communication. The electrical signal generated by amplification in such a way is output (applied) to the light emitting element 432.

The light emitting element 432 transmits a light signal (wireless signal) having the intensity in accordance with the electric signal generated at the transmitting unit 412 to the light receiving element 442. That is, the light emitting element 432 emits light at an intensity in accordance with the intensity (voltage) of the electric signal generated at the transmitting unit 412. The light launched from the light emitting element 432 propagates in the space between the shaft member 452 and the cylindrical member 451 and reaches the light receiving element 442. The light receiving element 442 receives a light signal (wireless signal) (receives light) transmitted from the light emitting element.

The receiver circuit 531 generates an electric signal in accordance with the intensity of a light (wireless signal) light-received (received) at the light receiving element 442.

Since a light signal received by the light receiving element 442 is subjected to attenuation due to propagation in the space but is amplified by the transmitting unit 412, the attenuation is offset. Therefore, a light signal with a stable intensity is received at the light receiving element 442 without being affected by light attenuation due to rotation of the shaft member 452. Thereby, even when the attenuation amount of the light intensity changes in accordance with the rotation angle of the shaft member 452, an electric signal with stable high level and low level is output from the receiver circuit 531 of the receiving unit 422 to the signal control device 406. This can prevent an error from occurring in data (logic 0 or 1) determined by the signal control device 406.

As described above, according to the first embodiment, stable bidirectional communication is allowed even when a light signal is subjected to attenuation due to rotation of the shaft member 452. Further, according to the first embodiment, in upstream communication, since a signal is amplified by using a detection result of a pilot signal in downstream communication, neither the pilot signal superimposing circuit nor the pilot signal detection circuit as in downstream communication is required. That is, a pilot signal superimposing circuit can be omitted in the transmitting unit 412, and a pilot signal detection circuit can be omitted in the receiving unit 422. It is possible to prevent erroneous determination of data in bidirectional communication even with such a simple configuration.

Note that, while the case where a pilot signal is transmitted and received in downstream communication has been described in the first embodiment, the embodiment is not limited thereto, and a pilot signal may be transmitted and received in upstream communication. In such a case, the pilot signal superimposing circuit and the pilot signal detection circuit can be omitted in the transmitting unit 411 and the receiving unit 421 that perform downstream communication. However, a pilot signal detection circuit and two amplification amount adjustment circuits are required on the rotating side, which may increase the area for circuit implementation or the power consumption of the circuit on the rotating side. In general, because size or power is limited more on the rotating side in a rotary joint such as the rotary joint of the robot arm 201, it is effective to transmit and receive a pilot signal in downstream communication.

Further, for example, in a light receiving element on the static side, when the light reception intensity when a light emitting element on the static side transmits a low level is above the light reception intensity when a light emitting element on the rotating side transmits a high level, it may be difficult to determine a low level or a high level in the light receiving element provided on the static side. With the light emitting element on the static side and the light receiving element on the static side are arranged at positions of 180 degrees, reception of light of the light emitting element provided on the static side is facilitated at the light receiving element provided on the static side. Thus, while the problem described above is likely to occur, it is difficult for the light receiving element provided on the rotating side to receive a light of the light emitting element provided on the rotating side. Therefore, in order to avoid the problem described above, it is preferable to cause the light emitting element 431 on the rotating side to superimpose a pilot signal and thereby not to cause the light emitting element 432 on the static side to emit light when the light emitting element 432 on the static side is in the low level. Also in terms of the above consideration, the configuration of the first embodiment is effective.

Further, while the case where the positional relationships of light emitting elements and light receiving elements are represented by the angles θ1 and θ2 and each of the angles θ1 and θ2 is 180 degrees has been described, the angles θ1 and θ2 may have an error from 180 degrees within a range in which a change in the light reception intensity is 0 to −6 dB. For example, when each light receiving face of the light receiving elements 441 and 442 is 5 mm on a side and the gap in the radial direction between the shaft member 452 and the cylindrical member 451 is 20 mm, it is preferable that the angles θ1 and θ2 be within a range from 173 degrees to 187 degrees where the attenuation amount is less than −6 dB. Note that, when displacement of the angles θ1 and θ2 is known, the amplification amount may be adjusted by the displacement.

Second Embodiment

Figure 10A:
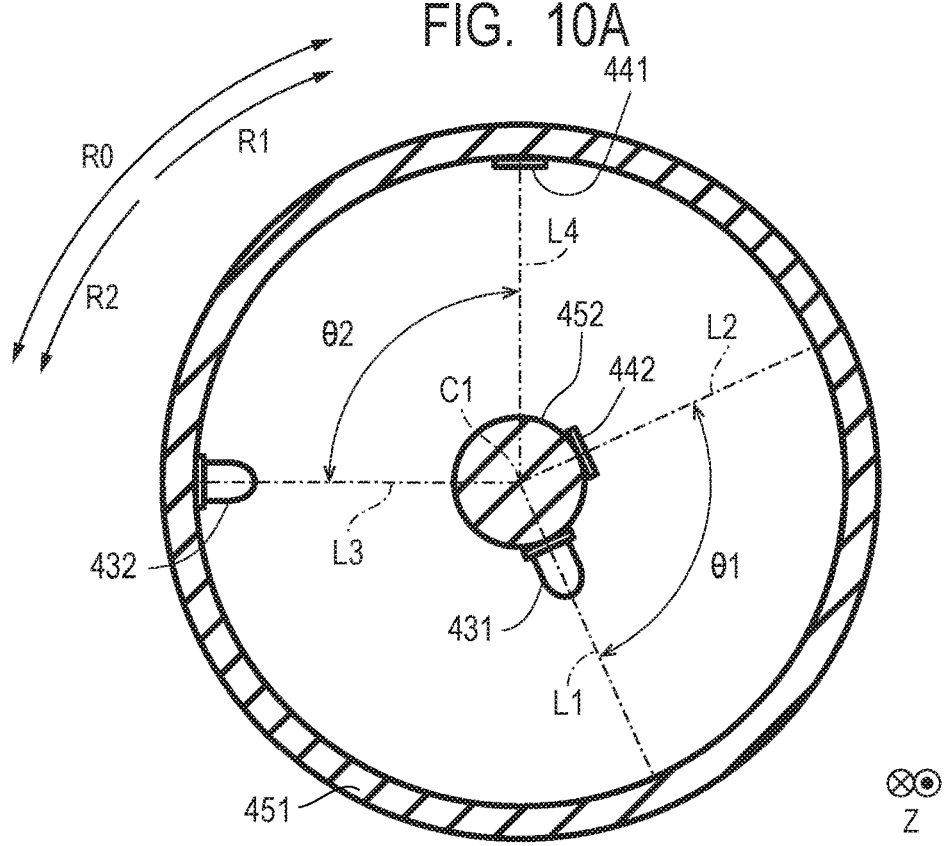
FIG. 10A is a diagram illustrating a locational relationship of a light emitting element and a light receiving element in a second embodiment.

Next, a bidirectional communication device according to a second embodiment will be described. FIG. 10A is a diagram illustrating of a locational relationship of light emitting elements and light receiving elements in the second embodiment. Note that, in the second embodiment, description of the same configuration as that in the first embodiment will be omitted. The bidirectional communication device of the second embodiment is different from that of the first embodiment in the locational relationship of the light emitting element 431 and the light receiving element 442 and the locational relationship of the light emitting element 432 and the light receiving element 441.

Specifically, while the case where both the angles θ1 and θ2 are 180 degrees has been described in the first embodiment, both the angles θ1 and θ2 are 90 degrees in the second embodiment. Further, in the second embodiment, with respect to two directions of the rotation direction of the rotary shaft 251, that is, with respect to the two directions R1 and R2 in the circumference direction R0, the direction R2 from the light emitting element 431 to the light receiving element 442 is opposite to the direction R1 from the light emitting element 432 to the light receiving element 441.

Figure 10B:
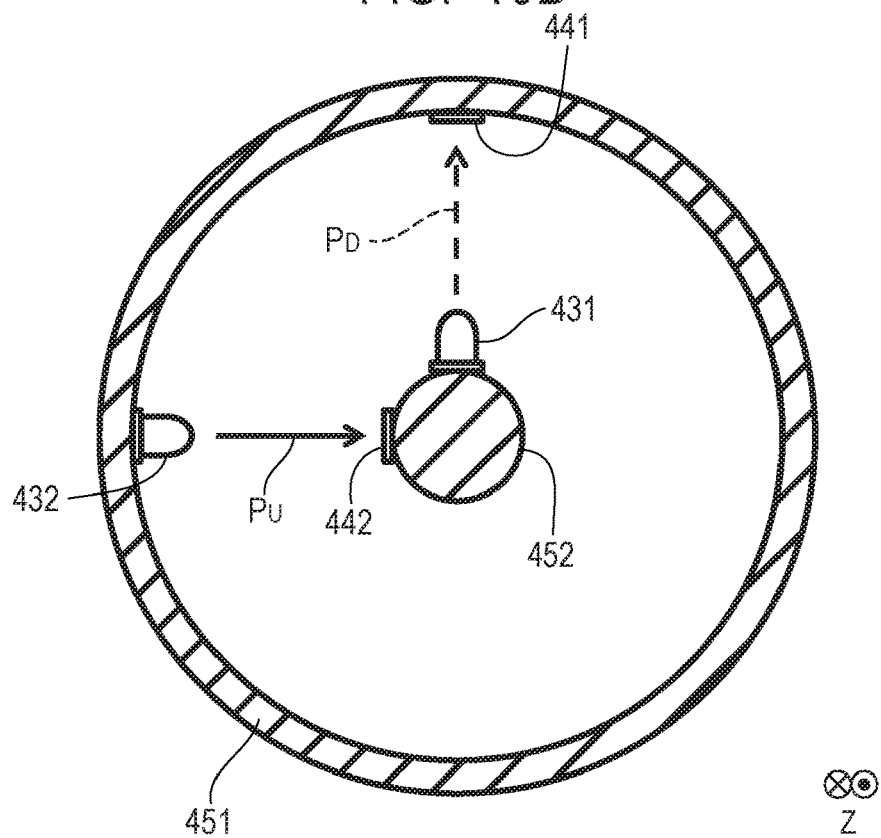
FIG. 10B is a diagram illustrating a state where a light emitting element faces a light receiving element.

FIG. 10B is a diagram illustrating a state where light emitting elements face the light receiving elements. As with the first embodiment, when the light emitting element 431 faces the light receiving element 441, the light emitting element 432 faces the light receiving element 442. Therefore, the light emitting element 431 comes the closest to the light receiving element 441, and the light emitting element 432 comes the closet to the light receiving element 442, which results in the shortest light paths $P_U$ and $P_D$. Thus, as with the first embodiment, each light attenuation amount is the smallest in both upstream communication and downstream communication, and the light reception intensity of the light received at each of the light receiving elements 441 and 442 is the highest.

When the shaft member 452 is rotated by 180 degrees from the above state, the light emitting element 431 faces the opposite side of the light receiving element 441, and the light emitting element 432 faces the opposite side of the light receiving element 442. Therefore, as with the first embodiment, each light attenuation amount is the largest in both upstream communication and downstream communication, and the light reception intensity of light received at each of the light receiving elements 441 and 442 is the lowest.

In a similar manner to the first embodiment, a change in the light reception intensity of the light receiving element 441 with respect to the rotation angle of the shaft member 452 is equal to a change in the light reception intensity of the light receiving element 442 with respect to the rotation angle of the shaft member 452, as illustrated in FIG. 7. Therefore, the transmitting units 411 and 412 and the receiving units 421 and 422 have the same configuration as those in the first embodiment, respectively (see FIG. 3). In this case, it is preferable that the receiving unit 421 amplify the intensity of the received electric signal at a larger amplification amount for a larger attenuation amount of a pilot signal component, and it is preferable that the transmitting unit 412 amplify the intensity of the transmitting electric signal at a larger amplification amount for a larger attenuation amount of a pilot signal component. As discussed above, also in the second embodiment, it is possible to perform stable bidirectional communication regardless of the rotation angle of the shaft member 452 as with the first embodiment.

Note that, while the case where the positional relationships of light emitting elements and light receiving elements are represented by the angles θ1 and θ2 and each of the angles θ1 and θ2 is 90 degrees has been described, the angles θ1 and θ2 may have an error from 90 degrees within a range in which a change in the light reception intensity is 0 to −6 dB.

Further, the angles θ1 and θ2 are not limited to 90 degrees, and the same effect and advantage is obtained as long as the angles θ1 and θ2 are the same when the angles θ1 and θ2 are each greater than 0 degree and less than 180 degrees.

Third Embodiment

Figure 11:
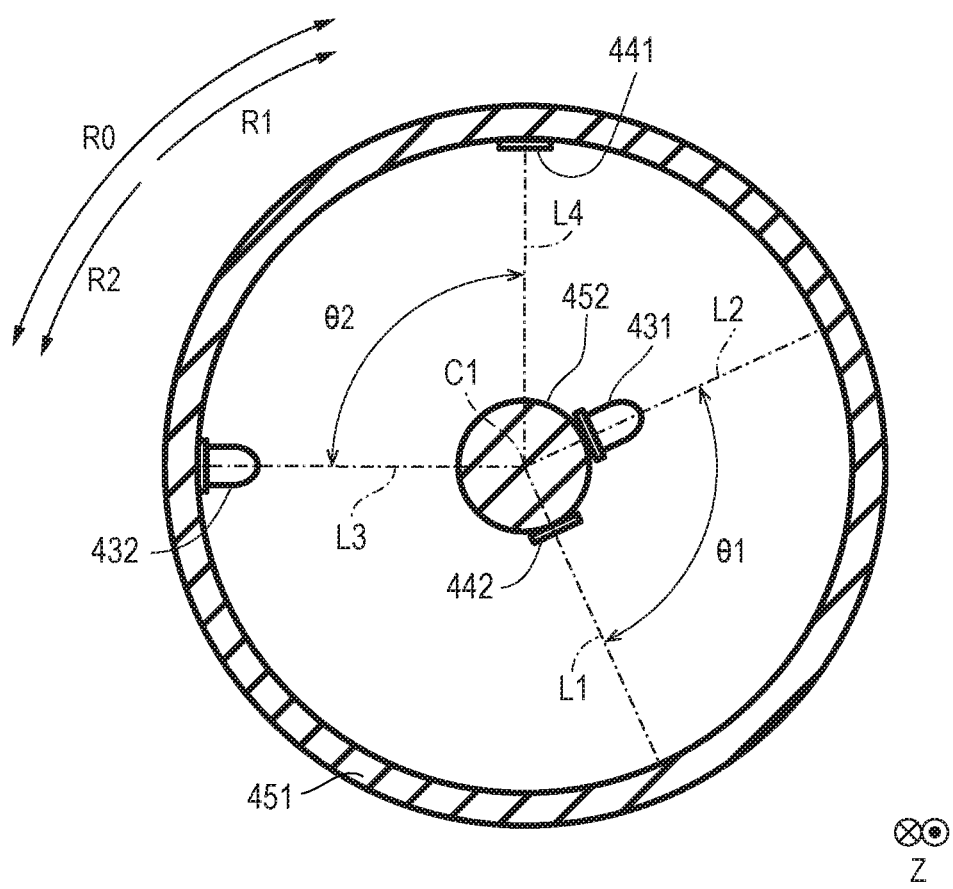
FIG. 11 is a diagram illustrating a locational relationship of a light emitting element and a light receiving element in a third embodiment.

Next, a bidirectional communication device according to a third embodiment will be described. FIG. 11 is a diagram illustrating of a locational relationship of light emitting elements and light receiving elements in the third embodiment. Note that, in the third embodiment, description of the same configuration as that in the first and second embodiments will be omitted. The bidirectional communication device of the third embodiment is different from that of the first and second embodiments in the locational relationship of the light emitting element 431 and the light receiving element 442 and the locational relationship of the light emitting element 432 and the light receiving element 441. Furthermore, the third embodiment is different from the first and second embodiments in the function of the second transmitting unit.

That is, while the case where both the angles θ1 and θ2 are 180 degrees has been described in the first embodiment, both the angles θ1 and θ2 are 90 degrees in the third embodiment. Further, in the third embodiment, with respect to two directions of the rotation direction of the rotary shaft 251, that is, with respect to the two directions R1 and R2 in the circumference direction R0, the direction R1 from the light emitting element 431 to the light receiving element 442 is the same as the direction R1 from the light emitting element 432 to the light receiving element 441.

Figure 12A:
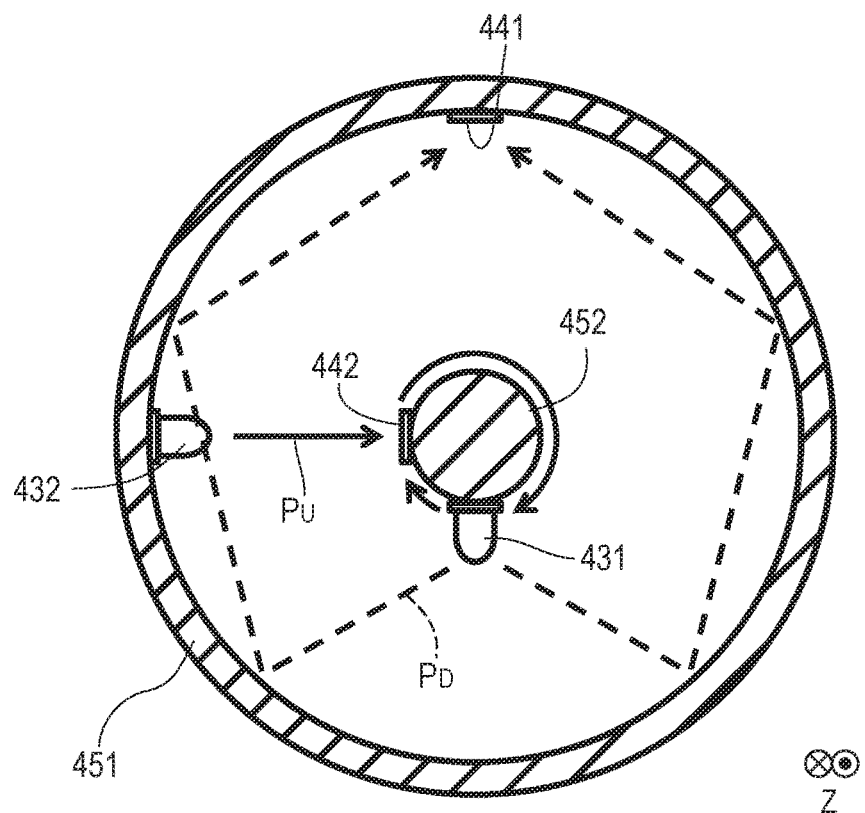
FIG. 12A is a diagram illustrating a state where, of two pairs of light emitting elements and light receiving elements, one pair of elements face each other.
Figure 12B:
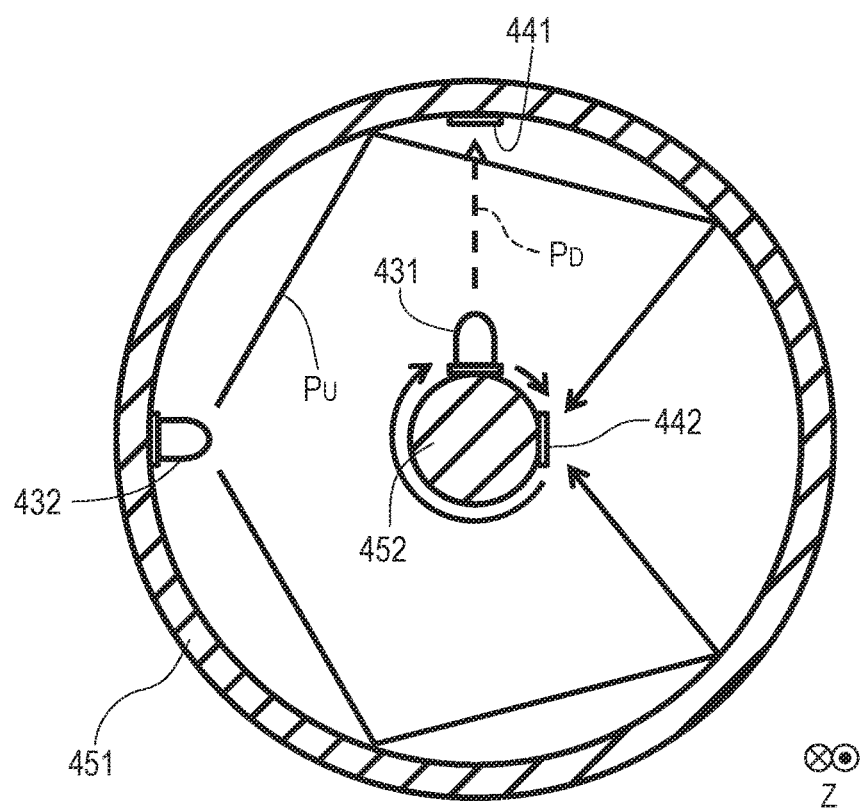
FIG. 12B is a diagram illustrating a state where, of two pairs of light emitting elements and light receiving elements, the other pair of elements face each other.

FIG. 12A is a diagram illustrating a state where, of two pairs of light emitting elements and light receiving elements, one pair of elements face each other. FIG. 12B is a diagram illustrating a state where, of two pairs of light emitting elements and light receiving elements, the other pair of elements face each other. That is, FIG. 12B illustrates a state where the shaft member 452 is rotated by 180 degrees from the state illustrated in FIG. 12A.

As illustrated in FIG. 12A, when the light emitting element 432 faces the light receiving element 442, the light emitting element 431 faces the opposite side of the light receiving element 441. In this case, the light emitting element 432 comes the closest to the light receiving element 442, which results in the shortest light path $P_U$ but the longest light path $P_D$. Therefore, while the light attenuation amount is the smallest in upstream communication, the light attenuation amount is the largest in downstream communication. Thus, while the light reception intensity of the light received at the light receiving element 442 is the highest, the light reception intensity of the light received at the light receiving element 441 is the lowest.

On the other hand, as illustrated in FIG. 12B, when the light emitting element 431 faces the light receiving element 441, the light emitting element 432 faces the opposite side of the light receiving element 442. In this case, the light emitting element 431 comes the closest to the light receiving element 441, which results in the shortest light path $P_D$ but the longest light path $P_U$. Therefore, while the light attenuation amount is the smallest in downstream communication, the light attenuation amount is the largest in upstream communication. Thus, while the light reception intensity of the light received at the light receiving element 441 is the highest, the light reception intensity of the light received at the light receiving element 442 is the lowest.

Figure 13:
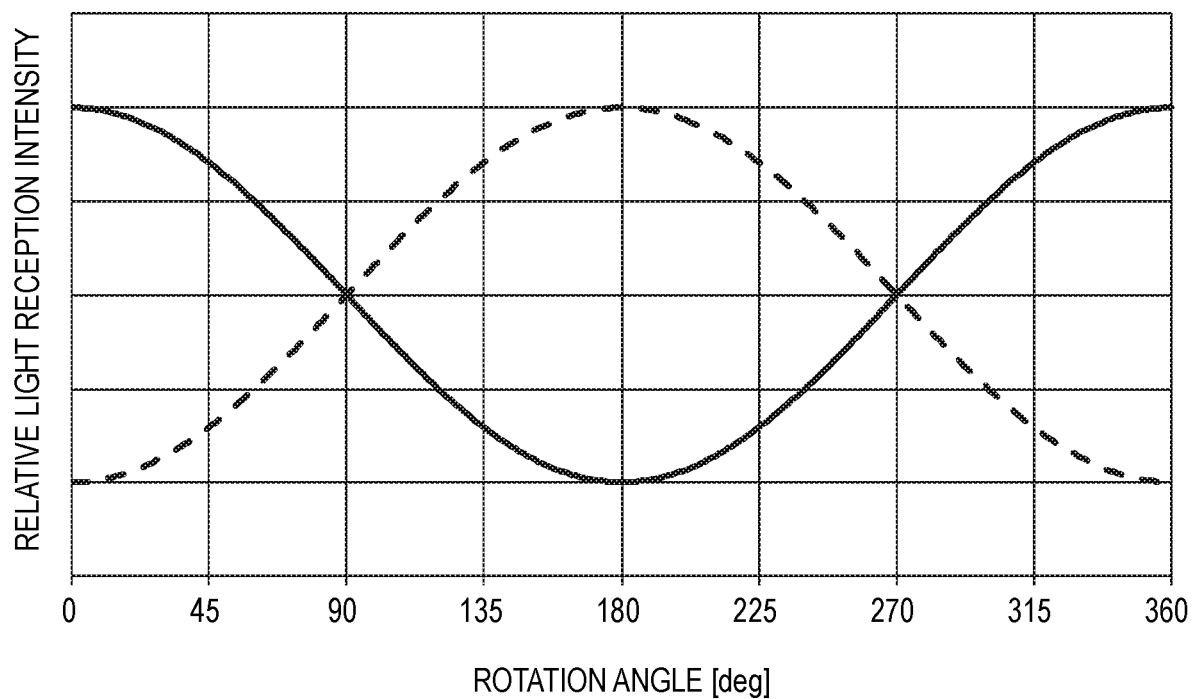
FIG. 13 is a graph illustrating a relative value of a light reception intensity of each light receiving element with respect to a rotation angle of a shaft member in the third embodiment.

FIG. 13 is a graph illustrating the relative value of the light reception intensity of each of the light receiving elements 441 and 442 with respect to the rotation angle of the shaft member 452 in the third embodiment. In FIG. 13, the light reception intensity of the light receiving element 442 (upstream communication) is illustrated by a solid line, and the light reception intensity of the light receiving element 441 (downstream communication) is illustrated by a dashed line. The positional relationship of the light emitting element 431 and the light receiving element 442 on the shaft member 452 side and the positional relationship of the light emitting element 432 and the light receiving element 441 on the cylindrical member 451 side are symmetrical. That is, the angles θ1 and θ2 are the same and equal to 90 degrees. However, the direction R1 from the light emitting element 431 to the light receiving element 442 is the same as the direction R1 from the light emitting element 432 to the light receiving element 441. Thus, as illustrated in FIG. 13, the change (dashed line) in the light reception intensity of the light receiving element 441 with respect to the rotation angle of the shaft member 452 and the change (solid line) in the light reception intensity of the light receiving element 442 with respect to the rotation angle of the shaft member 452 have the opposite relationship, that is, the dashed line and the solid line are in the opposite phase.

Figure 14:
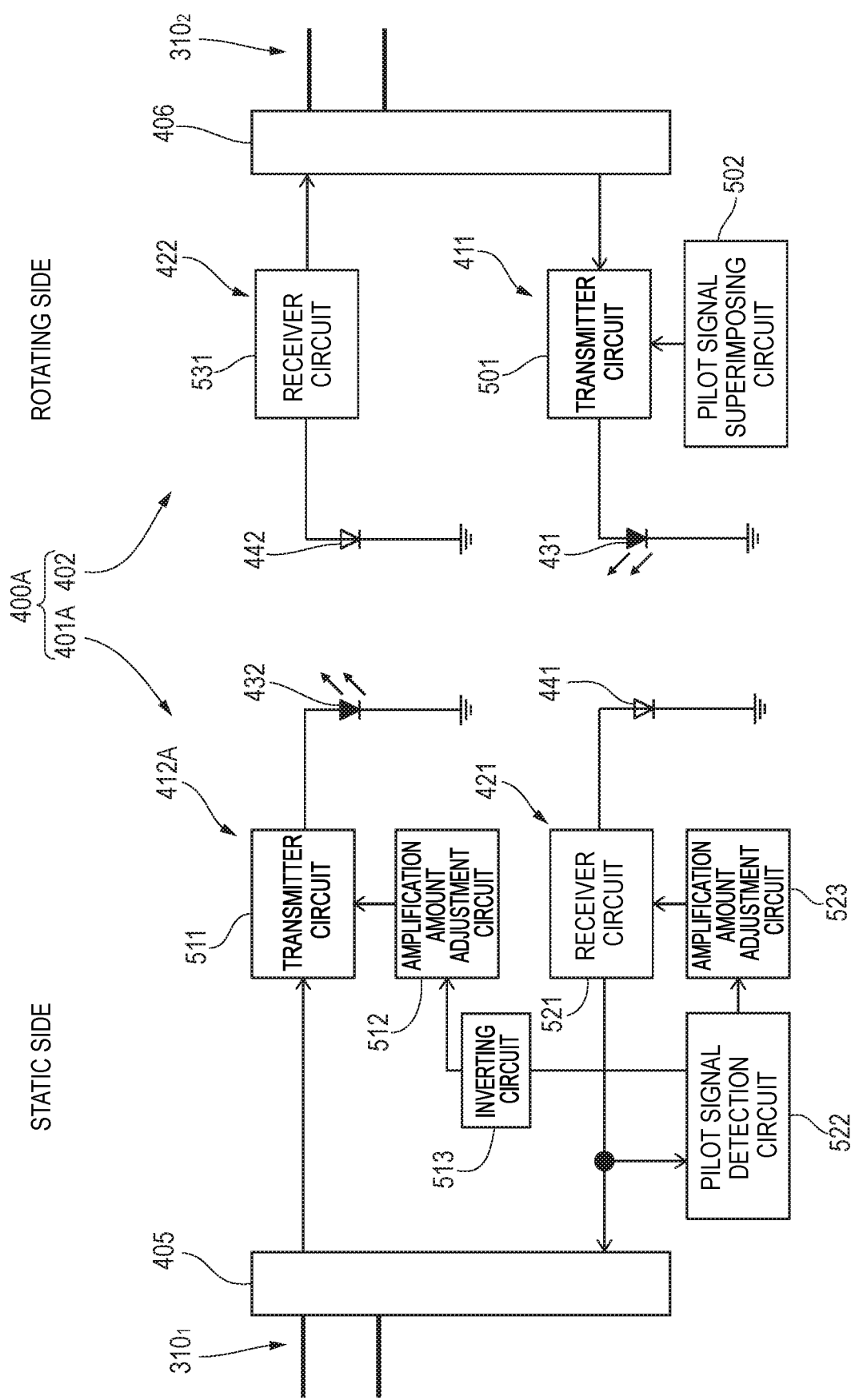
FIG. 14 is a block diagram illustrating a bidirectional communication device according to the third embodiment.

FIG. 14 is a block diagram illustrating a bidirectional communication device according to the third embodiment. A bidirectional communication device 400A has a signal transmission device 401A provided in the link 210 (FIG. 1) on the static side and a signal transmission device 402 provided in the link 211 (FIG. 1) on the rotating side. The signal transmission device 402 has the same configuration as that in FIG. 3 described in the first embodiment.

The signal transmission device 401A has the light emitting element 432 and the light receiving element 441 described above, a transmitting unit 412A that corresponds to the second transmitting unit, and the receiving unit 421 and the signal control device 405 that are the same as those in the first embodiment. The transmitting unit 412A has the transmitter circuit 511, the amplification amount adjustment circuit 512, and an inverting circuit 513. That is, the transmitting unit 412A of the third embodiment has a configuration in which the inverting circuit 513 is added to the configuration of the transmitting unit 412 described in the first embodiment.

The inverting circuit 513 inverts the intensity of a pilot signal component detected by the pilot signal detection circuit 522 and outputs the inverted intensity to the amplification amount adjustment circuit 512. Specifically, the inverting circuit 513 outputs, to the amplification amount adjustment circuit 512, an inverted intensity obtained by subtracting the intensity of the pilot signal component from the reference intensity described in the first embodiment. Thus, the amplification amount adjustment circuit 512 compares the inverted intensity with the reference intensity and amplifies the intensity of the input digital signal input to the transmitter circuit 511 in accordance with the inverted intensity. In such a way, the amplification amount adjustment circuit 512 amplifies the intensity of a digital signal at an amplification amount, which is an inverted version of that of the amplification amount adjustment circuit 523, in accordance with an attenuation amount of the intensity of a pilot signal component with respect to the reference intensity. Specifically, the amplification amount adjustment circuit 512 amplifies the intensity of an electric signal at a larger amplification amount for a larger inverted intensity. In other words, the amplification amount adjustment circuit 512 amplifies the intensity of an electric signal input from the signal control device 405 to the transmitter circuit 511 at a larger amplification amount for a smaller attenuation amount of the intensity of a pilot signal component.

As discussed above, even when the change of the light reception intensity with respect to the rotation angle is inverted between upstream communication and downstream communication, amplification correction is possible as long as the angles θ1 and θ2 are equal to each other, as with the first embodiment.

A light having an intensity inverted from the intensity in downstream communication is received by the light receiving element 442. While the light signal received by the light receiving element 442 is subjected to attenuation due to propagation of the space, a light signal is amplified at an amplification amount inverted from that in the downstream communication in the transmitting unit 412A, and thus the attenuation is offset. Therefore, a light signal with a stable intensity is received at the light receiving element 442 without being affected to the light attenuation due to rotation of the shaft member 452. Thus, even when the attenuation amount of a light intensity changes in accordance with a rotation angle of the shaft member 452, an electric signal with stable high level and low level is output from the receiver circuit 531 of the receiving unit 422 to the signal control device 406. This can prevent an error from occurring in data (logic 0 or 1) determined by the signal control device 406.

As described above, according to the third embodiment, stable bidirectional communication is allowed even when a light signal is subjected to attenuation due to rotation of the shaft member 452. Further, according to the third embodiment, in upstream communication, since a signal is amplified by using a detection result of a pilot signal in downstream communication, neither the pilot signal superimposing circuit nor the pilot signal detection circuit as in downstream communication is required. That is, the pilot signal superimposing circuit can be omitted in the transmitting unit 412A, and the pilot signal detection circuit can be omitted in the receiving unit 422. It is possible to prevent erroneous determination of data in bidirectional communication even with such a simple configuration.

Note that, while the case where a pilot signal is transmitted and received in downstream communication has been described in the third embodiment, the embodiment is not limited thereto, and a pilot signal may be transmitted and received in upstream communication.

Further, while the case where the positional relationships of the light emitting elements and the light receiving elements are represented by the angles θ1 and θ2 and each of the angles θ1 and θ2 is 90 degrees has been described, the angles θ1 and θ2 may have an error from 90 degrees within a range where a change in the light reception intensity is 0 to −6 dB.

Further, the angles θ1 and θ2 are not limited to 90 degrees, and the same effect and advantage is obtained as long as the angles θ1 and θ2 are the same when the angles θ1 and θ2 are each greater than 0 degree and less than 180 degrees.

The present invention is not limited to the embodiments described above, and various modifications are possible within the technical concept of the present invention. Further, the advantages described in the embodiments are to merely list the most preferable advantages resulted from the present invention, and the advantages of the present invention are not limited to those described in the embodiments.

While the case of performing optical communication has been described in the embodiments described above, the embodiment is not limited thereto. While it is preferable to perform optical communication, communication using a radio wave or communication using an electric field or a magnetic field may be performed. For example, the transmitting element and the receiving element may be configured at a resonance portion such as an antenna, the transmitting unit may have a modulation circuit, and the receiving unit may have a demodulation circuit.

Further, while the case where a bidirectional communication device is mounted on a rotary joint of a robot arm has been described in the embodiments described above, the embodiment is not limited thereto, and the bidirectional communication device may be mounted on a rotating portion of an end effector of a robot hand or the like. Further, without being limited to a rotary joint, the bidirectional communication device may be mounted on a portion where wireless communication is necessary in a robot. Furthermore, the bidirectional communication device is not limited to a robot device and can be mounted on general apparatuses that need wireless communication to be performed in bus communication.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A wireless communication device comprising:
a first transmitting unit provided on a first member;
a first receiving unit provided on a second member and having a relative distance which changes with respect to the first transmitting unit;
a second receiving unit provided on the first member; and
a second transmitting unit provided on the second member and having a relative distance which changes with respect to the second receiving unit,
wherein the first transmitting unit generates a first electric signal obtained by superimposing a pilot signal on a first digital signal to be transmitted and transmits a first wireless signal having an intensity in accordance with the first electric signal,
wherein the first receiving unit generates a second electric signal in accordance with the intensity of the received first wireless signal and detects a pilot signal component from the second electric signal,
wherein the second electric signal is amplified in accordance with an attenuation amount of the pilot signal component,
wherein the second transmitting unit generates a third electric signal obtained by amplifying, in accordance with the attenuation amount, a second digital signal to be transmitted and transmits a second wireless signal having an intensity in accordance with the third electric signal, and
wherein the second receiving unit generates a fourth electric signal in accordance with the intensity of the received second wireless signal.

2. The wireless communication device according to claim 1, wherein one member of the first member and the second member is fixed to a shaft and is a member that rotates relatively with respect to the other member.

3. The wireless communication device according to claim 2, wherein the first transmitting unit has a first transmitting element, and the first receiving unit has a first receiving element, and
wherein the first transmitting element and the first receiving element are arranged on the same plane in a direction in which a rotation axis of the shaft extends.

4. The wireless communication device according to claim 3, wherein the second transmitting unit has a second transmitting element, and the second receiving unit has a second receiving element, and
wherein the second transmitting element and the second receiving element are arranged on the same plane as the first transmitting element and the first receiving element in a direction in which the rotation axis of the shaft extends.

5. The wireless communication device according to claim 4, wherein the first transmitting element, the second transmitting element, the first receiving element, and the second receiving element are arranged at positions such that, when viewed from a direction in which the rotation axis extends, a first angle that is an angle between a line extending from the rotation axis to the first transmitting element and a line extending from the rotation axis to the second receiving element is equal to a second angle that is an angle between a line extending from the rotation axis to the second transmitting element and a line extending from the rotation axis to the first receiving element.

6. The wireless communication device according to claim 5, wherein each of the first angle and the second angle is 180 degrees.

7. The wireless communication device according to claim 5, wherein, with respect to two rotation directions of the shaft, one direction from the first transmitting element to the second receiving element is the same as the other direction from the second transmitting element to the first receiving element, and wherein the second transmitting unit amplifies an intensity of the second digital signal at a larger amplification amount for a smaller amount of the attenuation amount.

8. The wireless communication device according to claim 7, wherein each of the first angle and the second angle is 90 degrees.

9. The wireless communication device according to claim 5,
wherein, with respect to two rotation directions of the shaft, one direction from the first transmitting element to the second receiving element is opposite to the other direction from the second transmitting element to the first receiving element, and
wherein the second transmitting unit amplifies an intensity of the second digital signal at a larger amplification amount for a larger amount of the attenuation amount.

10. The wireless communication device according to claim 9, wherein each of the first angle and the second angle is 90 degrees.

11. The wireless communication device according to claim 4,
wherein the second transmitting element is a light emitting element that emits light, and
wherein the second receiving element is a light receiving element that receives light.

12. The wireless communication device according to claim 1, wherein the second transmitting unit amplifies an intensity of the second digital signal at a larger amplification amount for a larger amount of the attenuation amount.

13. The wireless communication device according to claim 1,
wherein the first transmitting element is a light emitting element that emits light, and
wherein the first receiving element is a light receiving element that receives light.

14. The wireless communication device according to claim 1,
wherein the first member is a cylindrical member, and
wherein the second member is a shaft member arranged inside the cylindrical member and coaxially with the cylindrical member.

15. An apparatus comprising:
the wireless communication device according to claim 1; and
a drive device that rotary-drives the second member.

16. The apparatus according to claim 15 further comprising a robot arm having a plurality of joints in which a hand is removable at an end joint of the plurality of joints,
wherein the wireless communication device and the drive device are mounted on at least one of the plurality of joints.

17. The apparatus according to claim 15 further comprising a hand and a robot arm having a plurality of joints,
wherein the wireless communication device is installed in at least one of the plurality of joints.

* * * * *